UNITED STATES PATENT OFFICE.

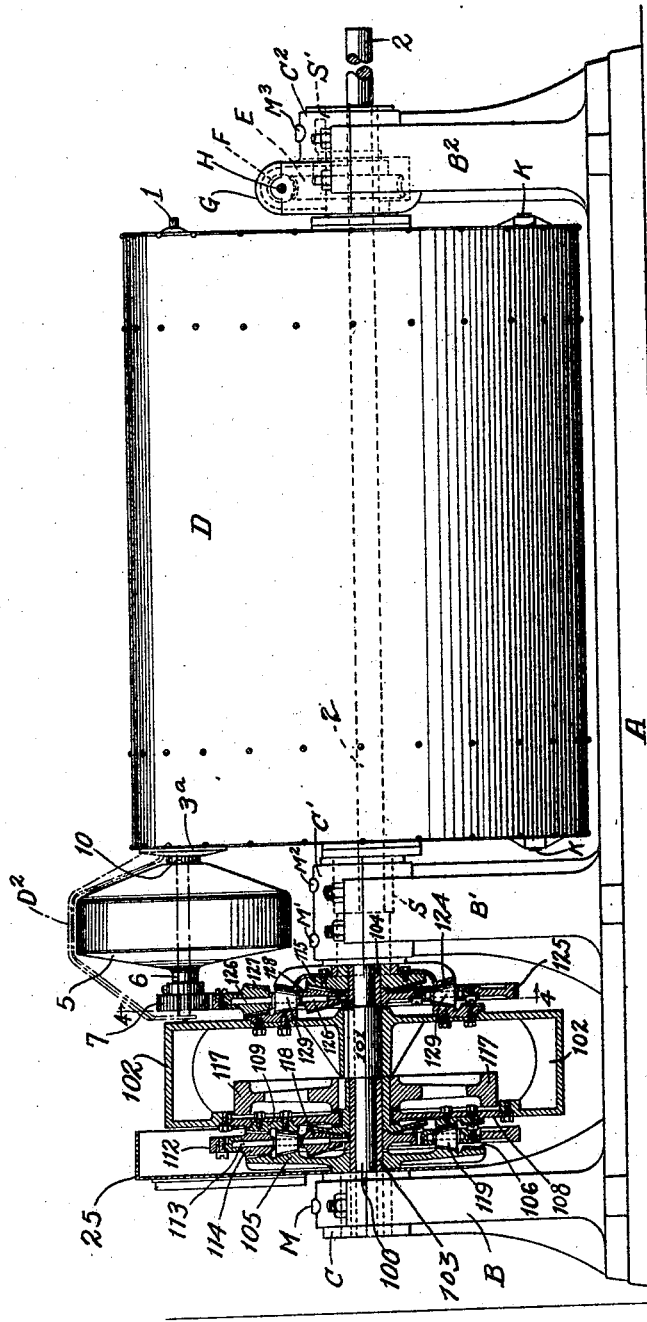

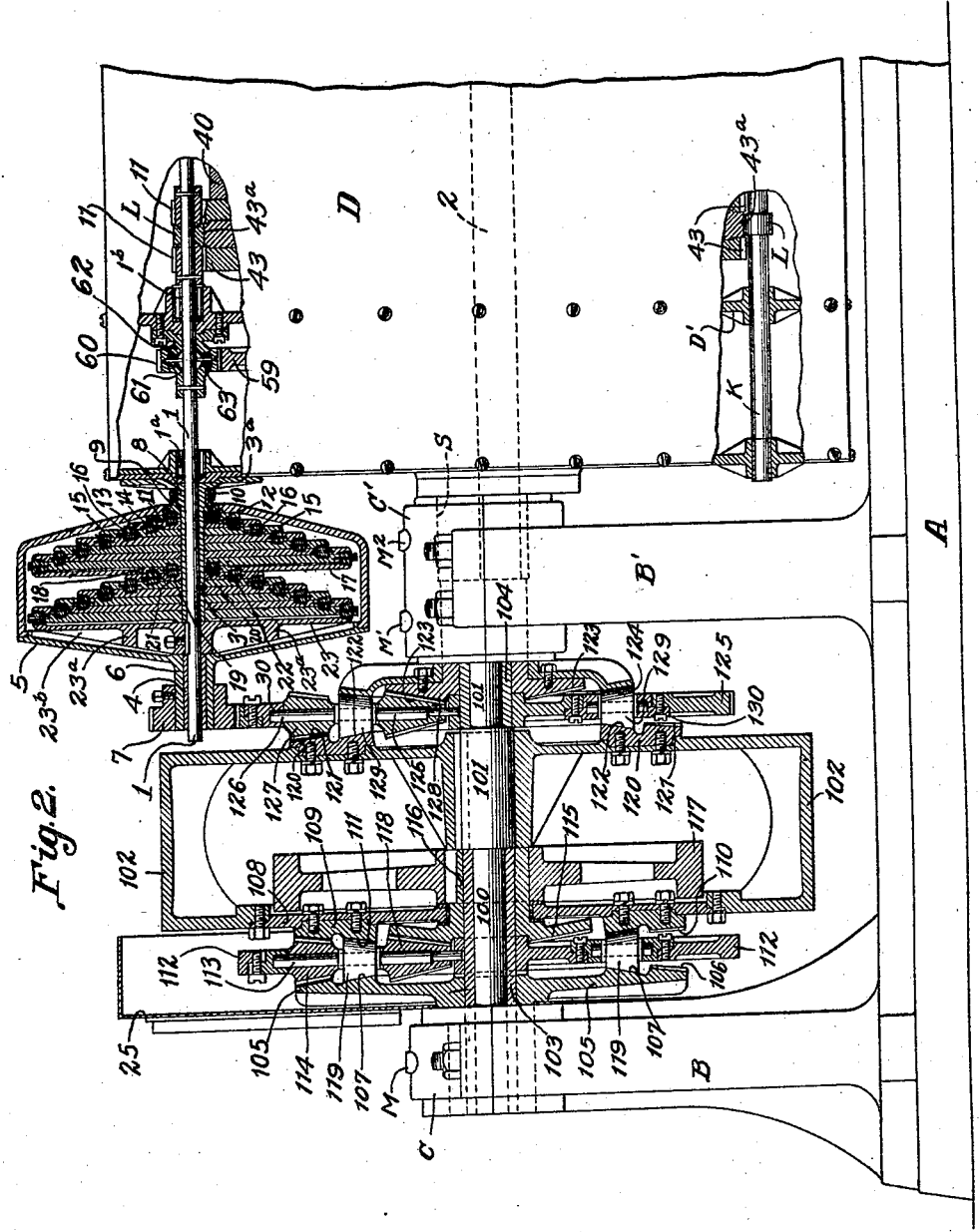

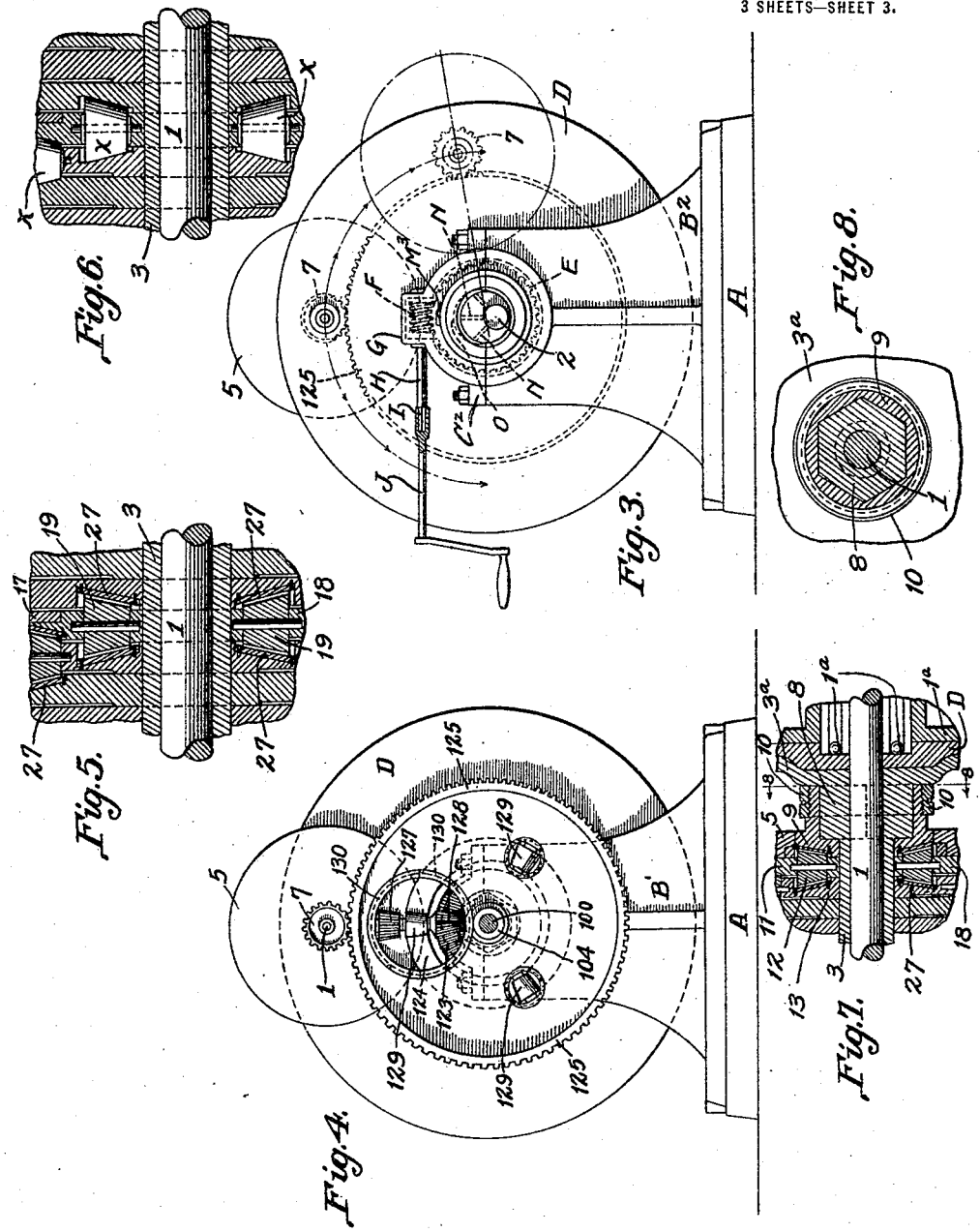

JAMES L. MAYS, OF DALLAS, TEXAS.

POWER-TRANSMISSION MECHANISM.

1,414,479.  Specification of Letters Patent.  Patented May 2, 1922.

Application filed January 31, 1921. Serial No. 441,359.

*To all whom it may concern:*

Be it known that I, JAMES L. MAYS, a citizen of the United States, residing at Dallas, in the county of Dallas and State of Texas, have invented certain new and useful Improvements in Power-Transmission Mechanism; and I do hereby declare the following to be a full, clear, and exact description of the invention, such as will enable others skilled in the art to which it appertains to make and use the same.

This invention relates to improvements in power transmission mechanism particularly applicable to an apparatus of the type disclosed in my application Serial No. 380,566, filed May 11th, 1920.

The objects of my invention are to improve the means for angularly adjusting a frame carrying power transmission gearing; to provide a compensating lubricating means; to provide means for transmitting motion from a prime mover in fixed position to an adjustable transmitting member in whatever position of angular adjustment it may be; to provide an incased fly-wheel; to improve speed gearing, and to otherwise improve the details of construction.

This invention consists in the new combinations and subcombinations more fully set forth in the ensuing description, defined in the appended claims and illustrated in the accompanying drawings.

In the accompanying drawings, in which similar reference characters indicate corresponding parts throughout the several views:

Figure 1 is an elevation of the mechanism partly in vertical section parallel with the axis of the machine;

Figure 2 is an enlarged view partly in section showing the mechanism at the left of Figure 1;

Figure 3 is an elevation viewed from the right hand side of Figure 1;

Figure 4 is a section on the line 4—4 of Figure 1;

Figure 5 is a sectional detail of a planetary gearing for operating the prime shaft;

Figure 6 is a sectional detail of a modified form of planetary gearing showing friction instead of beveled tooth gearing;

Figure 7 is a sectional detail through the sleeve and bearing of the prime shaft where it enters the frame or casing, said section being taken longitudinally of said shaft;

Figure 8 is a sectional detail on the line 8—8 of Figure 7.

In the drawings, A is the base of the machine which may be made of heavy cast iron; B, B' and B² are bearing pedestals rising from said base A and provided at their tops with suitable bearings C, C' and C², comprising cap pieces to be bolted down on top of the pedestals as is customary. The said pedestals B, B' and B² are arranged in common planes with the bearings C, C', C² in axial alinement.

D is a cylindrical casing, constituting a frame in which is mounted a mechanism substantially like that which is more fully disclosed in my said application. Projecting from the ends of the casing D, concentric therewith, are hubs S and S', said hubs being journaled in the bearings C' and C², respectively. The hub S extends half way through the bearing C' while the hub S' preferably extends through the bearing C². Keyed or otherwise rigidly secured to the hub S' is a worm wheel E. Meshing with the worm wheel E is a worm F. Said worm wheel E and worm F are suitably encased by a housing G in which are bearings for a shaft H free to rotate but held against longitudinal movement, the worm F being keyed or otherwise rigidly secured to said shaft H. One end of the shaft H is preferably squared as indicated at I in order to fit the socket of a socketed wrench J whereby the worm may be rotated and the worm wheel moved angularly to thereby adjust the angular position of the said frame or casing D and the contained mechanism. By this angular adjusting means the casing D may be moved angularly from the position shown in Figure 1 an angular distance of 90° in either direction about the axis of the initial driving pulley 102 to be hereinafter described.

Journaled in frame or casing D, remote from the center, is a prime shaft 1 having bearings in the casing and extending outward a considerable distance as shown at the left of Figures 1 and 2. By means of the prime shaft 1 the mechanism within the casing is driven, the said prime shaft having pinions 11, pinned or otherwise rigidly secured thereto, which mesh with external gear teeth 43 on a heavy rotary body 40 concentrically mounted with respect to the hubs S, S'. Equally spaced around the center of the casing D and at the same distance from the center as the prime shaft 1 are rods or shafts K having idle rollers L bearing upon a shroud 43ᵃ between the gear teeth 43. A corresponding roller L is arranged on the prime shaft 1 between the pinions 11. The purpose of the rollers L and shrouds 43ᵃ is to sustain the heavy body 40 in proper engagement with the pinions 11 at the pitch circumference of the gearing. The prime shaft 1 is sustained by suitable roller bearings 1ᵃ in the end plates of the frame or casing D and by roller bearings 1ᵇ in an annular web D' suitably bolted within said casing D, the latter bearing being constructed to take the thrust of the prime shaft.

As disclosed more fully in my said prior application, 59 is a gear wheel forming part of another train which meshes with a spur gear 60, free to rotate with respect to the prime shaft, and carrying planetary bevel pinions 63 in mesh with a fixed bevel gear 62 secured to the web D' and with a corresponding bevel gear 61 fixedly secured to the prime shaft 1 so as to rotate with it.

Both the train including the spur pinions 11 fixed to the prime shaft, and the train including the planetary gears 60, 61, 62 and 63, extend between the prime shaft 1 and a shaft 2 having bearing eccentrically in the said hubs S and S', the said shaft 2 extending into the hub S half way through the bearing C', and entirely through the hub S' and outward beyond said hub, said extending end of the shaft 2 being adapted to carry a pulley or other means whereby motion may be transmitted from said end of the shaft 2 to operate any piece of machinery desired.

The particular mechanism within the frame or casing D is no part of my present invention, the same having been disclosed and claimed in my said prior application.

Each of the bearings C, C' and C² is provided with oil cups or oil orifices formed in the bosses M, M', M² and M³. The oil holes may obviously be left open or they may be capped or oil cups may be screwed into them, if desired.

In order to properly distribute oil to the shaft 2 from the oiling devices M² and M³, in whatever angular position the hubs S, S' may be, I form in the said hubs angularly disposed ducts N extending from the outside of the hubs to the bearing holes therein through which the shaft 2 passes. In the inner upper sides of the bearing surrounding said hubs an arc-shaped cavity O is formed, said arc-shaped cavity communicating with the oil hole in the boss M³. By this means whatever may be the adjustment of the frame or casing D and the resultant angular position of the hub S, oil may flow freely through one or other of the ducts N and properly lubricate the shaft 2. It will be understood that the described oiling device is applicable to the bearings C' and C² which carry the hubs S and S'.

Journaled in the bearings C and C' of the pedestals B and B' is a shaft 100 which extends half way through the bearing C' to the end of the hub S, and may extend entirely through the bearing C. This shaft is coaxial with the hubs S and S'. Between the pedestals B and B' said shaft 100 has an enlargement 101 to which is keyed a cylindrical hollow pulley or other initial driving member 102. Surrounding the shaft 100 on each side of the enlargement 101 are bearing sleeves 103 and 104, said bearing sleeves being stationary with respect to the pedestals, the said shaft 100 turning in them. Fixed with respect to the pedestal B and the sleeve 103 is a bevel gear 105 having a row of bevel gear teeth 106 adjacent its circumference and a smooth annular raceway or track for conical bearing rollers at 107. Bolted to an outer side of the hollow initial driving member 102 is an annular plate 108 to which is secured an annular gear member 109 having an annular row of bevel gear teeth 110 opposite the teeth 106 and an annular smooth bearing track 111 opposite the bearing track 107. The plate 108 is rabbeted in the pulley 102 as shown. Rotatably mounted on the sleeve 103 between the fixed gear 105 and the annular gear member 109 on the rotary pulley 102 is a circular disk 112, said disk carrying at least one radial shaft 113 to which a beveled pinion 114 is secured, said bevel pinion 114 being in mesh with the gears 106 and 110 so that the rotation of the pulley 102 will cause the disk 112 to rotate at one half the angular speed of said pulley 102. Also journaled to rotate on the sleeve 103 is a bevel gear 115 having a hub 116 extending into the pulley 102 and having a fly wheel 117 keyed to it within said pulley. On the radial shaft 113 is a second bevel pinion 118 in mesh with said bevel gear 115. As a result of this construction rotation of the body 112 will rotate the gear 115 and thereby the fly wheel 117 within the pulley 102 at a speed considerably greater than that of pulley 102. By the construction shown the major part of the weight of the fly wheel and gearing just described is removed from the shaft 100, and sustained by the stationary sleeve 103 and the pedestal B. The annular disk 108, bolted to the pulley 102, is mounted so as to turn freely with respect to the hub 116. Conical bearing rollers 119 are equally distributed, preferably 120° apart, in the disk 112 and roll on the bearing tracks 107 and 111.

On the outer side of the hollow pulley 102 that is opposite that to which the gear 109 is secured is bolted an annular body 120 having a toothed gear annulus 121 and a runway 122 for a roller bearing. Rigidly secured with respect to the standard B' and to the sleeve 104 is a bevel gear 123 and a member having a roller track 124. Journaled to rotate freely upon the sleeve 104 is a spur gear 125. On a radial shaft 126, carried by said spur gear, is a bevel pinion 127 arranged so as to mesh with the bevel gear teeth 121. Another bevel pinion 128 secured to said radial shaft 126 is arranged in mesh with the fixed bevel gear 123. Between the pinions 127 and 128 and secured to the shaft 126 is a conical roller 129. Other conical rollers 129 are equally spaced around the center of said gear 125 and by preference I space said rollers 120° apart, as illustrated in Figure 4. The ratio of the gear rings 121 and 123 may be reversed if desired so that the gear of smaller diameter may be on the pulley and the larger one fixed to the frame.

In order to set a radial shaft carrying rollers and pinions in the rotary disk 112 or in the gear 125 I may form a round opening, as illustrated in Figure 4, having its edge rabbeted as shown in Figure 2. Two semiannular sections 130 are then formed having rabbets corresponding to the rabbets in the disk 112 or gear 125. Bearings for the ends of the shaft are provided, one in each of said sections, the shafts and gears assembled with the sections and the resulting rings with the gears and roller or the rollers alone are inserted and bolted into place.

Fixed to the frame or casing D and surrounding the prime shaft 1 projecting from said casing is a sleeve 3 secured to the casing by a flange 3ª. A bushing 4 of the same size as the sleeve 3 surrounds the outer end of said shaft 1, leaving a space between them exposing the shaft 1 for a purpose to be presently set forth. Rotatably mounted coaxial with the shaft 1 is a revoluble housing 5 having a hub 6, to which is secured a pinion 7 arranged to mesh with the teeth of the spur gear 125. Rotation will therefore be imparted at a considerably increased angular speed from the spur gear 125 to the pinion 7, which, being secured to the hub 6 of the housing 5, will cause said housing 5 to rotate rapidly about the axis of the shaft 1.

Within the housing 5 is a series of planetary gear sets adapted to transmit the rotary motion of the housing 5 at a considerably increased speed to the prime shaft 1, preferably so that to one rotation of the housing the prime shaft will rotate fourteen times.

The portion of the sleeve 3 which is adjacent the casing D has a polygonal preferably hexagonal exterior as at 8. Sleeved over the hexagonal portion 8 is a bevel gear 9 the hub of which is threaded exteriorly and surrounded by an adjusting ring 10 whereby the gear 9 may be properly spaced from the frame or casing D. The perimeter of the gear 9 is cylindrical and forms a second bearing surface for the rotary housing 5 which has been described as also having the hub 6 lined by the bushing 4 journaled on shaft 1. Secured inside the housing at the right, as shown in Figure 2, is a bevel gear ring 11 and on a radial axis in said bevel gear 11 is a bevel pinion 12 which may be duplicated at equally spaced points around said gear 11. The said pinion 12 will therefore be carried around with the gear 11 as the housing 5 rotates, and meshing on one side with the fixed gear 9 and on the other side with a gear 13, will impart rotation at twice the speed of said gear 11 to said bevel gear 13 with which said pinion 12 is in mesh. The said bevel gear 13 carries one or more pinions 14 which roll in mesh with gear teeth cut in the bevel gear 11 and mesh with a corresponding row of bevel teeth in an adjacent gear 15. The bevel gear 15 in turn carries a bevel pinion 16 meshing with bevel teeth in the gear 13 and with bevel teeth in another gear and the sets are repeated as described to the bevel gear 17 which rotates seven times as fast as the housing 5. The bevel gear 17 carries with it a bevel gear 18 and a radial pinion 19 which rolls in an annulus of bevel teeth in the gear 20 and engages another annular row of bevel teeth in the bevel gear 21 which in turn carries a bevel pinion 22 rolling in mesh with the gear teeth 18, and imparting rotation in its turn to the beveled pinion 21. This arrangement is repeated until the final bevel gear 23, which is secured to the prime shaft 1, is engaged and rotated at a speed which in the embodiment illustrated is fourteen times the speed of the housing 5. It will be understood that the speed ratios may be varied within wide limits by varying the number of sets of planetary gears.

Preferably the gear 23 that is keyed to the prime shaft is of fly wheel character, said wheel 23 being constructed with a heavy flange 23ª, the wheel being braced and strengthened by webs 23ᵇ, whereby to steady the running of the prime shaft 1 at high speeds.

Steady-arms D² are indicated in Figure 1 for the purpose of sustaining and steadying the outer end of prime shaft 1, and prevent flexing thereof during its operation.

By the construction shown the speed gearing is wholly inclosed and may turn in oil if desired. The weight of such speed gearing is taken mainly by the sleeve 3 surrounding the prime shaft 1, the sleeve 3 being very rigidly secured by means of the flange 3ª to the frame or casing D.

It is preferred to house the gearing at the left of the hollow pulley 102, as shown in Figures 1 and 2, within a casing 25.

In order to facilitate the cutting of the bevel gear teeth that are remote from the peripheries of the bevel gear disks illustrated within the housing 5, separate gear rings 27 are preferably cut and secured in grooves formed in said gear disks, as illustrated in Figure 5, which is a section taken axially of the prime shaft 1 through the center of the nest of planetary gears.

If desired, the toothed bevel pinions may be friction pinions, as illustrated in Figure 6, and may drive from one to another of the gears by frictional engagement.

When using friction gears instead of beveled toothed gearing the several gears may be kept in close contact by adjusting the ring 10 shown in axial section in Figure 7 and in cross sectional enlarged detail in Figure 8.

By the means described the frame or casing D may be set at any required adjustment through an arc of 180° by applying the wrench J to the squared end I of the shaft G and rotating it the required amount. Throughout the said range of adjustment the shaft 2 may be kept properly oiled by means of the oiling device scribed. The said adjustment may be made without disturbing the driving relation thereto of the initial driving wheel carried on the shaft 100 since the casing D rotates during the adjustment about an axis which is a prolongation of the axis of of the shaft 100. The initial driving gear runs steadily under the momentum of the concealed fly wheel 117 and said fly wheel is not exposed to endanger attendants. Very few of the gears are exposed and the mechanism presents a neat, compact appearance and enables the shaft 2 to be geared to drive any desired piece of mechanism at a relatively high speed. The initial driving motor may be belted to the pulley 102 so that no adjustment is necessary to compensate for any position of the adjustable frame or casing D.

Having described my invention in such manner as to enable those skilled in the art to make and use the same, what I claim and desire to secure by Letters Patent of the United States is:

1. The combination of supports having alined bearings, a cylindrical frame having hubs concentric therewith journaled in said bearings, power transmission mechanism within said frame, said power transmission mechanism including a prime shaft remote from and parallel with the axis of said hubs, said prime shaft projecting from the frame at one end and carrying a pinion, an initial driving mechanism journaled on an axis in line with the axis of said frame, said initial driving mechanism comprising a gear concentric with said axis and meshing with the pinion on the prime shaft; and means whereby said frame may be angularly adjusted.

2. The combination of supports having alined bearings, a cylindrical frame comprising a casing having hubs concentric therewith journaled in said bearings, power transmission mechanism within said casing including a prime shaft remote from and parallel with the axis of said hubs said prime shaft projecting from said frame at one end, a pinion on the prime shaft, an initial driving wheel mounted on an axis coaxial with that of the hubs, a bevel gear fixed with respect to the supports, a bevel gear fixed to said initial driving wheel, a spur gear located between said bevel gears and coaxial with them, said spur gear being in mesh with said pinion on the prime shaft, a radial shaft mounted in said spur gear, and bevel pinions fixed to said radial shaft engaging respectively, said bevel gears.

3. The combination of supports having alined bearings, an angularly adjustable frame having hubs journaled in said bearings, power transmission mechanism in said frame, said power transmission mechanism including a prime shaft remote from and parallel with the axis of said hubs and projecting from the frame at one end, a pinion on the prime shaft, an independent shaft coaxial with the axis of said frame, an initial driving wheel on said shaft, said driving wheel carrying a bevel gear on its side, a bevel gear fixed to a stationary support, said fixed gear being of different diameter than the gear fixed to the initial driving wheel, a spur gear between and coaxial with the gears on said support and on said initial driving wheel, a radial shaft in said gear, a bevel pinion fixed to said radial shaft and meshing with the bevel gear on the initial driving wheel, and a second bevel pinion fixed to said radial shaft and meshing with the fixed gear on the support.

4. In a power transmission mechanism, supporting means, an initial driving wheel sustained by said supporting means and carrying on one face an annular row of bevel gear teeth and an annular beveled trackway, a smaller bevel gear fixed to the supporting means and facing said initial driving wheel, an intermediate wheel journaled coaxially with the axis of the initial driving wheel between said driving wheel and said fixed gear, a radial shaft carried by said intermediate wheel, said radial shaft having a bevel pinion secured thereto in engagement with the gear on the initial driving wheel, a second bevel pinion secured thereto in mesh with the fixed gear on the support, and a conical roller interposed between said bevel pinion and engaging the said trackway, and a trackway fixed to the supporting means also engaging said roller.

5. In a power transmission mechanism, supports, alined bearings carried by said supports, a shaft journaled in said bearings, a hollow initial driving wheel fixed to said shaft, said hollow wheel having on an exterior face an annular row of bevel gear teeth, a bevel gear fixed to a supporting means and having a row of bevel teeth facing the bevel teeth on said initial driving wheel, a disk mounted between said fixed gear and said initial driving wheel, said disk having a radial shaft, a bevel pinion fixed to said radial shaft, said pinion engaging the teeth of the fixed bevel gear and the bevel teeth on the initial driving wheel, a second bevel pinion fixed to said shaft, a bevel gear having teeth engaging said second bevel pinion and a hub projecting into the interior of said initial hollow driving wheel, and a fly wheel secured to said hub within the hollow driving wheel.

6. In a power transmission mechanism, supports having alined bearings, a shaft mounted to rotate in said bearings, a hollow driving wheel fixed to said shaft, a sleeve secured to one of said bearings, said sleeve surrounding said shaft and projecting into the interior of said hollow wheel, said hollow wheel having a row of bevel gear teeth on one side, a gear fixed to the support and having a row of teeth facing the bevel gear teeth on the hollow driving wheel, a disk mounted to rotate on said sleeve between said fixed gear and said initial driving wheel, said disk having a radial shaft, a bevel pinion fixed to said shaft and engaging the bevel teeth on the initial driving wheel and the bevel teeth on said fixed gear, a second pinion fixed to said radial shaft, a bevel gear journaled on said sleeve having teeth meshing with the teeth of said second mentioned bevel pinion and having a hub encircling said fixed sleeve and projecting within said initial driving wheel, and a fly wheel fixed to said hub.

7. In a power transmission mechanism, the combination of supports having alined bearings, a shaft journaled to rotate coaxially of said bearings, said shaft having an enlarged portion between said bearings, an initial driving wheel keyed to the enlarged portion of said shaft but extending axially beyond said enlarged portion, sleeves fixed to said bearings encircling said shaft at each side of the enlarged portion, and power transmitting gearing journaled on said sleeves at opposite sides of the enlarged portion of said shaft, said power transmitting gearing being geared to and arranged to be operated by said initial driving wheel.

8. In a power transmitting mechanism, a frame, a prime shaft projecting from said frame, a bevel gear wheel fixed to said shaft, a sleeve fixed to the frame and surrounding said shaft, a bevel gear fixed to said sleeve, a housing concentric with said sleeve, said housing having a hub, a driving means secured to said hub, a bevel gear fixed to said sleeve and facing said bevel gear that is secured to said shaft, a bevel gear fixed to said housing, and a plurality of sets of planetary gears interposed between said last mentioned gear and the gear fixed to said prime shaft, said planetary gears being incased by said housing.

9. In a power transmission mechanism, a frame comprising a casing carrying gearing, a prime shaft for operating said gearing extending from said casing, a sleeve fixed to said casing and surrounding said prime shaft, a bevel gear secured to said sleeve, a bevel gear secured to said prime shaft, a housing concentric with said sleeve, said housing having a hub, a driving wheel on said hub, a bevel gear fixed to said housing adjacent said fixed bevel gear and facing the bevel gear secured to the shaft and a plurality of sets of planetary gears operated by the housing for communicating motion from said bevel gear fixed to said housing and said fixed gear to said bevel gear fixed to said shaft, said planetary gears being inclosed in said housing.

10. A casing inclosing a power transmission mechanism therein, a prime shaft extending therefrom, a sleeve fixed to the casing and surrounding said prime shaft, a housing mounted so as to rotate concentrically with respect to said prime shaft, a bevel gear keyed to said prime shaft within said housing, said sleeve having a polygonal portion adjacent said casing, a bevel gear having a hub fitted over said polygonal portion, a sleeve threaded on said hub and adapted to bear against said casing, a bevel gear carried by said housing, said bevel gear carrying a radial pinion meshing with said fixed gear, and a series of planetary gears between said fixed gear and said gear fixed to the shaft.

11. In mechanism of the class described, supporting means, a frame having a hub journaled in said supporting means, a power transmitting mechanism within said frame including a shaft extending into said hub, said hub having a plurality of ducts angularly disposed with respect to each other and extending from the shaft hole to the exterior of the hub, a bearing surrounding said hub said bearing having an oil hole and an arc-shaped cavity in its inner wall for distributing the oil from said oil hole to said ducts, and means whereby said frame may be angularly adjusted in said bearings.

12. In a mechanism of the class described, a shaft, a hollow wheel secured thereto, a gear concentric with said shaft at one side of said hollow wheel, said gear having a hub extending within said hollow wheel, a fly wheel secured to said hub inside of said hollow wheel, means for rotating said gear from said hollow wheel, said hollow wheel having an opening in its side to admit the fly wheel.

13. In a mechanism of the class described, a shaft, a hollow wheel secured thereto, a gear concentric with said shaft at one side of said hollow wheel, said gear having a hub extending within said hollow wheel, a fly wheel secured to said hub inside of said hollow wheel, means for rotating said gear from said hollow wheel, said hollow wheel having an opening in its side to admit the fly wheel and a filler plate closing said opening, and having rotary engagement with the hub of said gear.

14. In a planetary gear mechanism, a rotary member having an opening with a rabbeted edge, a divided frame adapted to fit said rabbeted opening, alined bearings in said frame parts, respectively, and a shaft journaled in said bearings, said shaft carrying a rotary member.

15. In a planetary gear mechanism, a rotary member having a circular opening with a rabbeted edge, a frame comprising two semicircular rings adapted to fit said opening, and a shaft journaled in said semicircular rings, said shaft carrying a rotary member.

16. In a mechanism of the class described, a cylindrical body having an external row of gear teeth, and a shroud surface adjacent the gear teeth, a pinion engaging said teeth, and angularly separated rollers bearing upon the shrouded surface to retain said pinion and gears with their pitch surfaces in proper engagement.

In testimony whereof I affix my signature.

JAMES L. MAYS.